H. A. LYON.
AUTOMATIC WATER FEED FOR ENSILAGE APPARATUS.
APPLICATION FILED SEPT. 15, 1919.

1,347,392.

Patented July 20, 1920.
3 SHEETS—SHEET 1.

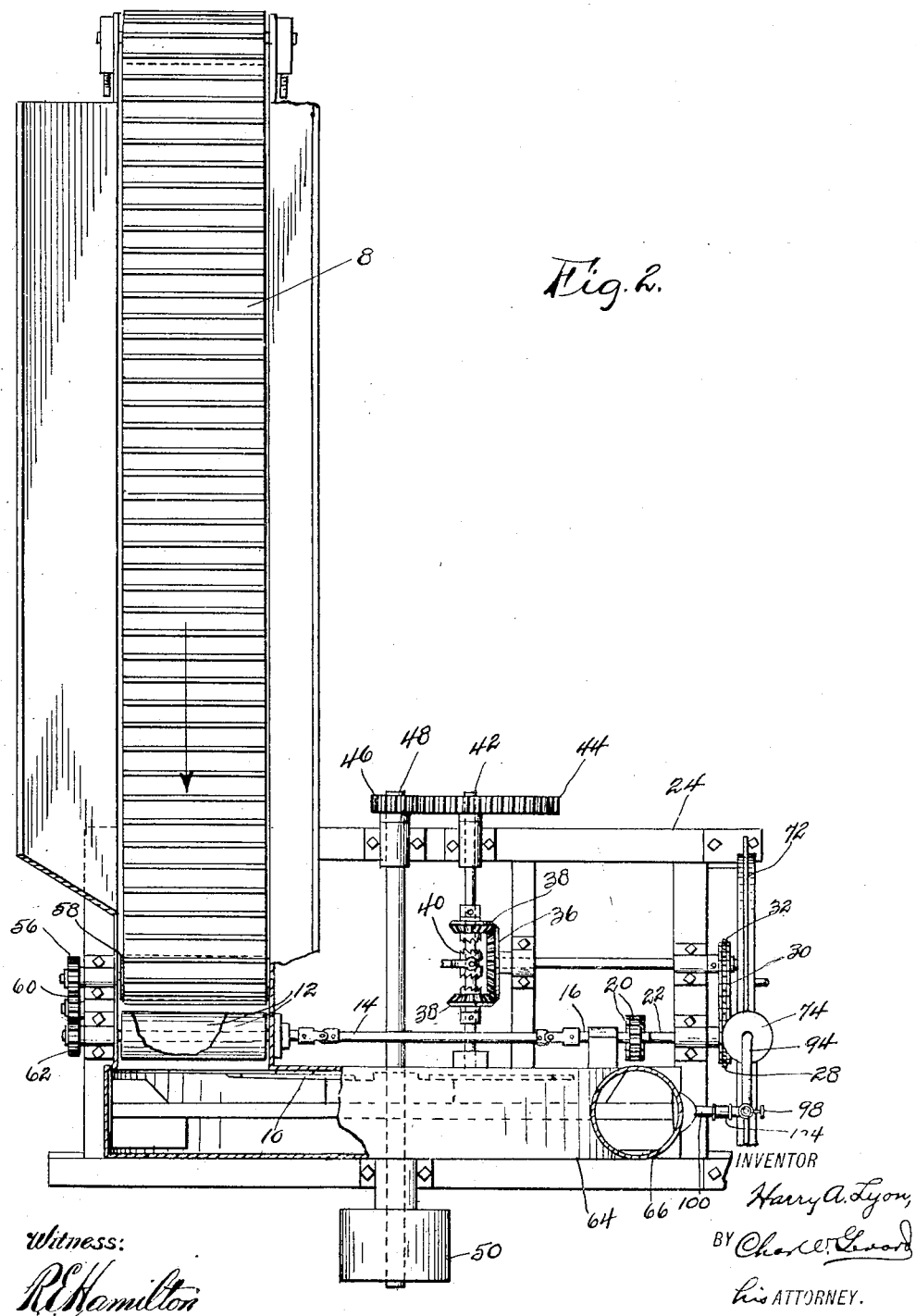

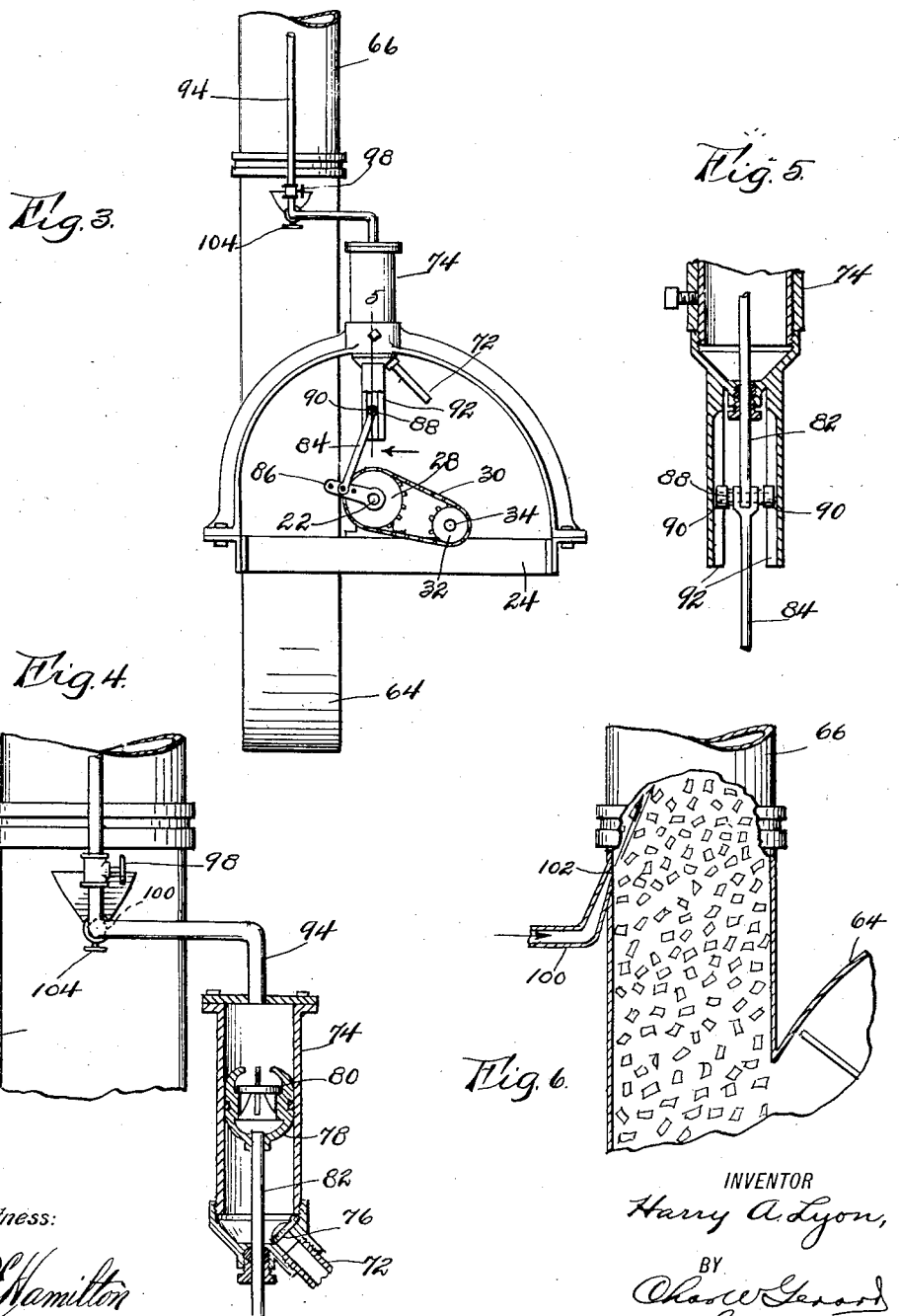

UNITED STATES PATENT OFFICE.

HARRY A. LYON, OF KANSAS CITY, MISSOURI, ASSIGNOR OF ONE-HALF TO JOHN L. ORR, OF SPRINGFIELD, OHIO.

AUTOMATIC WATER-FEED FOR ENSILAGE APPARATUS.

1,347,392.   Specification of Letters Patent.   Patented July 20, 1920.

Application filed September 15, 1919. Serial No. 324,022.

*To all whom it may concern:*

Be it known that I, HARRY A. LYON, a citizen of the United States, residing at Kansas City, in the county of Jackson, State of Missouri, have invented certain new and useful Improvements in Automatic Water-Feed for Ensilage Apparatus, of which the following is a complete specification.

The present invention relates to ensilage apparatus, and aims to provide an improved device for automatically feeding water as required to the ensilage material on its way from the cutting mechanism to the silo bin.

Accordingly I have devised an improved water feeding mechanism whereby the flow of water is maintained automatically, and is also controlled and regulated automatically in accordance with the rate at which the ensilage material is being supplied to the silo. Provision is also made for discharging the water supply into the path of the material at the most effective points for becoming properly mingled with said material.

With this general object in view, the invention will be described with reference to the accompanying drawings wherein is illustrated one form of construction for suitably embodying the proposed improvements, after which the novel features of the same will be set forth and particularly defined in the appended claims.

In the drawings—

Fig. 2 is a plan view (partly broken away) of the conveying, cutting and water feeding mechanism on a larger scale (the silo bin being omitted);

Fig. 3 is a detail elevation showing the pumping device;

Fig. 4 is a similar view on a larger scale and showing the pump cylinder in vertical section;

Fig. 5 is a detail section taken on the line 5—5 of Fig. 4; and

Fig. 6 is a detail sectional view illustrating that point of the water feed where it is discharged upwardly into the path of the ensilage material as it leaves the blower.

Figure 1:
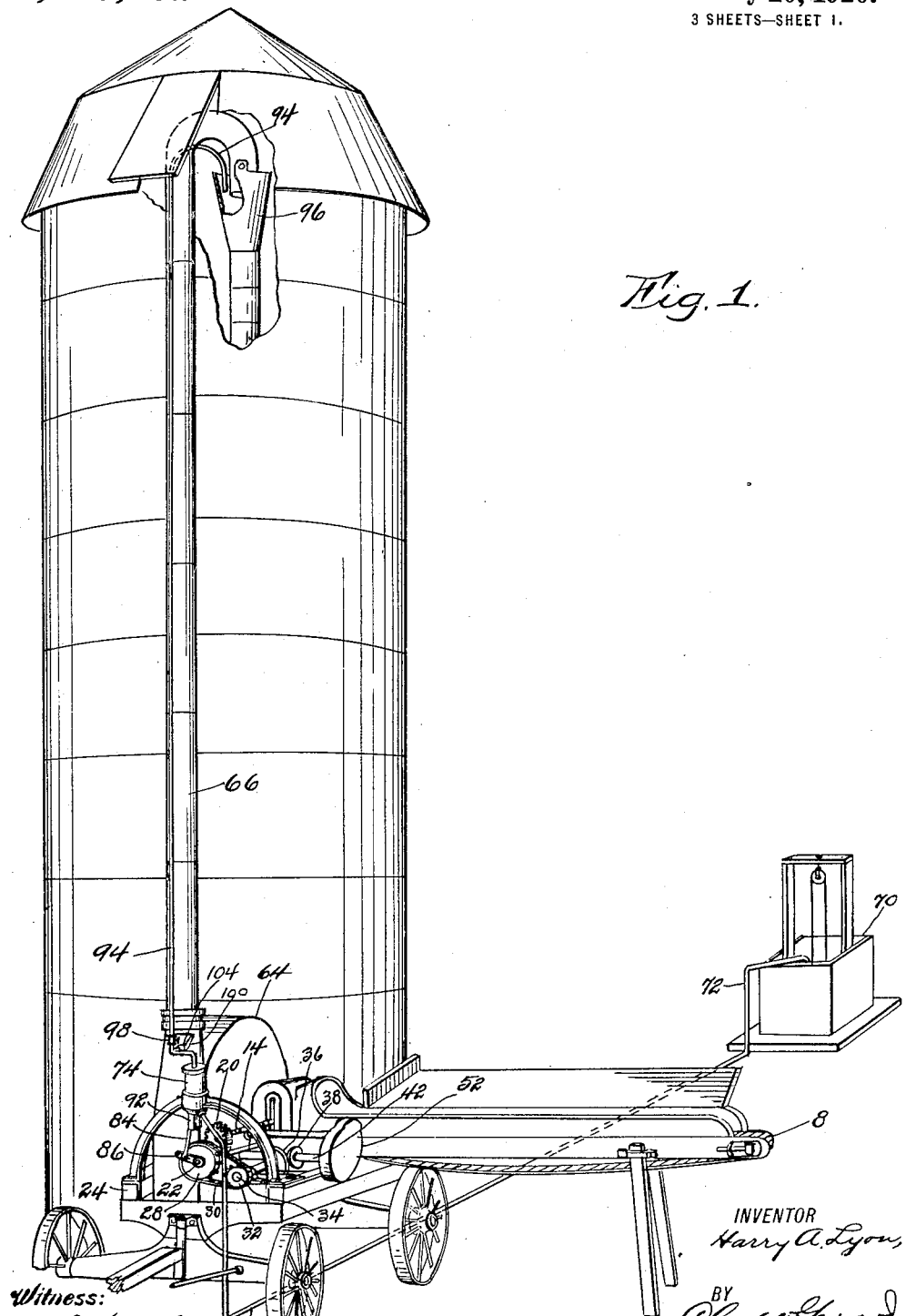
Figure 1 is a perspective elevation showing an ensilage apparatus embodying the present features of improvement.

Referring now to the drawings in detail, these illustrate the improvements in connection with an ordinary type of endless conveyer mechanism 8 by which the ensilage material is fed to cutting mechanism—designated generally by the numeral 10 (Fig. 2). The material is taken from the conveyer by means of discharge rollers 12, one of which is driven from a shaft 14 connected flexibly with a shaft 16 operated by gears 20 from a shaft 22, all being supported by the framework 24 of the ensilage cutting apparatus. The shaft 22 is provided with a sprocket wheel 28 driven by a chain 30 from a sprocket wheel 32 on a shaft 34 provided with a bevel gear 36 meshing with a pair of bevel pinions 38 having clutch hubs adapted to be alternately engaged by a sliding clutch element 40, whereby the drive may be operated in either direction. The pinions 38 are mounted on a shaft 42 which carries a gear wheel 44 driven by a pinion 46 on a shaft 48 which is equipped with a belt pulley 50. A housing 52 may be provided for incasing the gears 44—46 as illustrated in Fig. 1. The conveyer drive comprises a gear 56 connected with the roller 58 at the delivery end of the conveyer 8 and meshing with an intermediate gear 60 which in turn is driven by a gear 62 connected with the shaft of the upper discharge roller 12, as clearly shown in Fig. 2. The product of the ensilage cutting mechanism is driven by means of a suitable blower 64 through a conduit 66 leading from the cutting apparatus up to the top of the silo bin 68 (see Fig. 1).

The foregoing construction is, in general, of a type now in use for silo filling purposes, and the present invention is designed to supply automatically and in proper proportions the required amount of moisture and to impart the same to the product of the ensilage cutting mechanism on its way into the bin. For this purpose I conduct water from any suitable source, as from a well 70, through a pipe 72 to a pump cylinder 74 with which it communicates by way of a check valve 76. This cylinder 74 is fitted with a piston 78 carrying a check valve 80 and provided with a plunger rod 82 operated by a pitman member 84 which is adjustably connected (as indicated in Fig. 3) with a crank 86, this crank being secured to the outer end of the shaft 22. The connecting pin 88 joining the rod 82 and pitman 84 is fitted with rollers 90 operating in suitable guideways 92 depending from the lower head of the cylinder 74. An outlet pipe 94 leads from the upper head of the pump cylinder to the top of the silo bin where it discharges into the hood 96 attached to the mouth of the conduit 66 for moistening the discharged product continuously as it leaves the said conduit and falls into the bin. A valve 98 is provided for regulating the flow through the pipe 94 or for entirely cutting off the same when desired. Just below the valve 98, a branch pipe 100 is connected with the pipe 94 and leads to the conduit 66 at a point passed by the material soon after it leaves the cutting mechanism and adjacent to the blower 64, and a nozzle effect is produced by tapering the discharge end of said branch pipe to form a jet orifice as indicated at 102 (see Fig. 6), the arrangement being such as to discharge the water jet upward into the path of the ensilage material. The branch pipe 100 is also fitted with a regulating valve 104.

In the operation of the apparatus, the material to be operated upon is placed onto the conveyer 8 in the usual manner, said material being fed into the cutting mechanism and then driven by the blower into the conduit 66 in the direction of the top of the bin. So long as the conveyer and cutting mechanism are being driven, the pump which supplies the water will also be operated to feed an appropriate supply of water through either or both of the pipes 94 and 100, according as either or both of the valves 98 and 104 are open. Obviously the pump is driven continuously at the same relative rate as the feeding mechanism, being connected up with the same drive, and therefore the amount of water supplied to the ensilage product is automatically regulated according to the rate at which said product is fed into the bin. An advantage also characterizes the arrangement of the discharge from the branch pipe 100, in that this feeds the water to the material at a point where it most effectually moistens the same, due to the separated condition of the material and the spraying effect is enhanced because of its taking place under the influence of the blower action. Of course the rate of the pump's operation may be conveniently regulated by adjusting its connection with the crank 86, and the rate of feed may also be regulated further by means of the valves 98 and 104 and the flow through either pipe entirely cut off if desired by closing the corresponding valve.

It will thus be apparent that I have devised a simple and efficient arrangement and construction for carrying out the desired objects of the invention, and while I have described and illustrated what is now regarded as the preferred form of embodiment of the improvements I desire to reserve the right to make such formal changes or modifications as may fairly fall within the scope of the appended claims.

Having described the invention, what I claim and desire to secure by Letters-Patent is:

1. In an ensilage apparatus, the combination with ensilage cutting mechanism, of a conduit for conducting the material away from said cutting mechanism, a blower device for driving the material through said conduit away from said cutting mechanism, and pumping means responsive to the rate of operation of said cutting mechanism and operating to discharge a jet of water into the path of the material within said conduit at a point immediately adjacent to the blower device.

2. In an ensilage apparatus, the combination with ensilage cutting mechanism, of a conduit for conducting the material away from said cutting mechanism, a blower device for driving the material through said conduit away from said cutting mechanism, and pumping means operating automatically to feed water through the material during its transit through said conduit and provided with a pipe connection communicating with the intake end of said conduit immediately adjacent to the blower device, said pipe connection being provided with a jet orifice arranged to discharge into said conduit in a direction corresponding substantially to the direction of movement of the material therein.

In witness whereof I affix my signature.

HARRY A. LYON.